(12) United States Patent
Kaplan et al.

(10) Patent No.: US 7,121,830 B1
(45) Date of Patent: Oct. 17, 2006

(54) METHOD FOR COLLECTING, ANALYZING, AND REPORTING DATA ON SKILLS AND PERSONAL ATTRIBUTES

(75) Inventors: Robert E. Kaplan, New York City, NY (US); Robert B. Kaiser, Greensboro, NC (US)

(73) Assignee: Kaplan Devries Inc., Greensboro, NC (US)

( * ) Notice: Subject to any disclaimer, the term of this patent is extended or adjusted under 35 U.S.C. 154(b) by 176 days.

(21) Appl. No.: 10/323,711

(22) Filed: Dec. 18, 2002

(51) Int. Cl.
*G06F 11/30* (2006.01)
*G09B 19/00* (2006.01)

(52) U.S. Cl. ........................... 434/219; 705/11
(58) Field of Classification Search ................ 434/219, 434/322, 323, 350; 705/11
See application file for complete search history.

(56) References Cited

U.S. PATENT DOCUMENTS

| | | | |
|---|---|---|---|
| 5,724,262 A * | 3/1998 | Ghahramani | 702/186 |
| 5,926,794 A * | 7/1999 | Fethe | 705/11 |
| 6,007,340 A * | 12/1999 | Morrel-Samuels | 434/236 |
| 6,275,812 B1 * | 8/2001 | Haq et al. | 705/11 |
| 6,735,570 B1 * | 5/2004 | Lacy et al. | 705/7 |
| 2002/0019765 A1 * | 2/2002 | Mann et al. | 705/11 |

OTHER PUBLICATIONS

"Guidelines for Self-Evaluation of EOT-PACI Projects", Prepared by the LEAD Center Evaluation Team, as presented at the NPACI All Hands Meeting, Feb. 2000, 39 pages.*
Inventory of Executive Roles, Dec. 1997—Kaplan DeVries Inc.

* cited by examiner

*Primary Examiner*—Kathleen Mosser
(74) *Attorney, Agent, or Firm*—Smith Moore LLP

(57) ABSTRACT

A method for collecting data relating to human performance skills and/or attributes comprising the steps of creating a questionnaire relating to the human performance skills of a target individual and establishing a rating scale for responses to the questionnaire. The rating scale comprises a dual sided continuum. The middle point on the dual sided scale is associated with the proper amount of the performance skill. The markers on the first side of the dual sided scale are associated with exhibiting too much of the human performance skill and the markers on the other side of the dual sided scale are associated with increased intensity of the human performance skill. Preferably, pairs of questionnaire elements are generated that relate to opposing but complementary performance skills to exhibit the individual's versatility in terms of dichotomies. The questionnaire results are compiled and a report is generated that that displays the results.

4 Claims, 7 Drawing Sheets

| FORCEFUL & ENABLING SUMMARY | FORCEFUL TOO LITTLE | | | | FORCEFUL TOO MUCH | | | | | ENABLING TOO LITTLE | | | | ENABLING TOO MUCH | | | |
|---|---|---|---|---|---|---|---|---|---|---|---|---|---|---|---|---|---|
| | S | P | D | ALL | ALL | S | P | D | | S | P | D | ALL | ALL | S | P | D |
| 1f. TAKES CHARGE | 1 | 1 | 0 | 2 | 3 | 0 | 1 | 2 | 1e. EMPOWERS | 0 | 1 | 4 | 5 | 1 | 1 | 0 | 0 |
| 2f. STEPS IN | 0 | 1 | 0 | 1 | 4 | 0 | 1 | 3 | 2e. TRUSTS PEOPLE TO HANDLE PROBLEMS | 1 | 4 | 4 | 9 | 0 | 0 | 0 | 0 |
| 3f. LEADS VISIBLY | 1 | 0 | 0 | 1 | 3 | 0 | 0 | 3 | 3e. SHARES THE LIMELIGHT | 0 | 4 | 4 | 8 | 1 | 0 | 1 | 0 |
| 4f. DOESN'T BACK DOWN EASILY | 0 | 0 | 0 | 0 | 7 | 1 | 2 | 4 | 4e. OPEN TO INFLUENCE | 0 | 2 | 4 | 6 | 0 | 0 | 0 | 0 |
| 5f. DECLARES SELF | 1 | 1 | 1 | 3 | 3 | 0 | 0 | 3 | 5e. RECEPTIVE TO OTHERS' IDEAS | 1 | 2 | 4 | 7 | 1 | 0 | 0 | 0 |
| 6f. ASKS CHALLENGING QUESTIONS | 1 | 1 | 0 | 2 | 3 | 0 | 1 | 2 | 6e. MAKES IT EASY FOR PEOPLE TO PUSH BACK | 0 | 1 | 4 | 5 | 2 | 1 | 0 | 0 |
| TOTALS | 4 | 4 | 1 | 9 | 23 | 1 | 5 | 17 | TOTALS | 2 | 14 | 24 | 40 | 5 | 2 | 1 | 0 |
| AVERAGE PER ITEM | 0.67 | 0.17 | 0.67 | 1.50 | 3.83 | 0.17 | 0.83 | 2.83 | | 0.33 | 2.33 | 4.00 | 6.67 | 0.83 | 0.33 | 0.17 | 0.00 |

NOTE: 12 PEOPLE RESPONDING. S = SUPERIORS (2), P = PEERS (5), D = DIRECT REPORTS (5), ALL = ALL COWORKERS COMBINED (12)

FIG. 4

METHOD FOR COLLECTING, ANALYZING, AND REPORTING DATA ON SKILLS AND PERSONAL ATTRIBUTES

BACKGROUND OF THE INVENTION

The present invention relates to a method for collecting, analyzing, and reporting human performance in general, and management performance in particular.

An organization's success is largely dependent on its management, and, therefore, it is critical that managers be evaluated effectively. An important part of evaluating the performance of a manager includes ascertaining how the manager's co-workers view his or her performance. This has often been done with ratings of questionnaire items. For example, respondents are presented with a list of statements describing a behavior, skill, attitude, or disposition and are asked to choose the option on a response scale that best characterizes the manager in question. Prior art response scales typically take one of two forms: (1) evaluation scales; or (2) frequency/magnitude scales.

Evaluation scales ask the respondent to judge how well the target individual performs a given task or behavior, as shown in Table 1 below. On the other hand, frequency/magnitude scales ask the respondent to evaluate how often the target individual engages in the behavior and how much the respondent agrees that the statement describes the target, an example of which is also shown in Table 1 below.

TABLE 1

Examples of conventional response scales

Evaluation scale[1]

How would you rate this person's competence in the following areas?
| Not developed | Under- developed | Competent | Very strong | Outstanding |
|---|---|---|---|---|
| 1 | 2 | 3 | 4 | 5 |

Frequency/magnitude scale[2]

Judge how frequently each statement fits the person you are describing.
| Not at all | Once in a while | Sometimes | Fairly often | Frequently, if not always |
|---|---|---|---|---|
| 0 | 1 | 2 | 3 | 4 |

Note:
[1]Taken from the Executive Success Profile (Hezlett et al., 1996);
[2]taken from the Full Range of Leadership Development: Manual foe the Multifactor Leadership Questionnaire (Bass & Avolio, 1997)

Evaluation scales do a fine job of capturing behaviors that are "underdone," which are represented with a low score. These scales, however, are ambiguous and misleading with regards to behaviors that are "overdone" because low scores tend to confuse the overdo/underdo distinction. For instance, a low rating of 2-"Underdeveloped" in response to "Takes preventative measures to avoid crisis management" may indicate a careless lack of foresight (underdo) or an ultra-conservative vigilance (overdo). Evaluation-type scales do not directly indicate why an individual is rated as being ineffective, and do not reflect the underdo/overdo distinction.

Frequency/magnitude rating scales are purely descriptive of the extent of a behavior or characteristic. Higher ratings generally reflect more of a given behavior, a stronger tendency, or whether something is more or less characteristic of the target being rated. It is often assumed that higher ratings on these scales indicate proficiency or mastery. This is evident in the fascination with getting "high scores."

Another problem associated with frequency/magnitude type scales is that of relating scores on evaluation scales with other measures using product-moment correlation in validation research, which is research that attempts to demonstrate that the measure does indeed measure what it is intended to measure. The product-moment correlation statistical procedure (and other linear data modeling techniques common in the behavioral sciences) rests on the assumption that more of a given behavior is "better." For example, a high rating of 4 ("Frequently, if not always") in response to the item "Speaks up in a group" using the frequency/magnitude scale could mean one of two things: either the individual speaks up appropriately often or that the individual dominates group discussions. Therefore, a high score does not mean that the individual is an effective communicator and group leader, etc. Again, there is no provision for the overdo extreme.

Another limitation of prior art methods for collecting data using questionnaires is that they fail to measure lopsidedness, which is the tendency to overdo one side and underdo the other side of a dichotomy or duality. Examples of such dichotomies include asserting oneself versus being responsive to others and talking versus listening. The view that human beings have difficulty striking a desirable balance between opposing behaviors, values, and attitudes has been around for a long time. The Swiss psychologist Carl Jung, for instance, spoke about the "interplay of opposites" and how, for example, the healthy adult can comfortably play both "feminine" and "masculine" roles in social behavior. Carl Jung also noted that one indicator that an adult is in an arrested state of development is a chronic reliance on the feminine mode to the exclusion of the masculine, or vice-versa.

The prior art methods for evaluating an individual's performance as a leader and/or manager have failed to directly capture the tendency to overdo one side and underdo the other side of a pair of complementary behaviors, attitudes, and other characteristics. This is because the prior art methods utilize questionnaires that lack a rating scale that directly indicates overdoing. Thus, there is a need in the art for a method for collecting and analyzing human performance data that directly measures overdoing a behavior, skill, or attribute.

SUMMARY OF THE INVENTION

The present invention provides a method for collecting data relating to human performance skills and/or attributes including the steps of creating a questionnaire comprising elements relating to the human performance skills and/or attributes of a target individual, establishing a rating scale for responses to the elements in the questionnaire wherein the rating scale comprises a dual sided continuum having a first side and a second side and a plurality of markers, designating a marker in the middle of the continuum as the middle marker which is associated with a proper amount of the performance skill and/or attribute, designating the markers on the first side of the middle marker on the continuum as exhibiting too much of the human performance skill and/or attribute, said markers being associated with increased intensity of the human performance skill and/or attribute as the markers get further away from the middle marker, designating the markers on the second side of the middle marker on the continuum as exhibiting too little of the human performance skill and/or attribute, said markers being associated with increased intensity of the human performance skill and/or attribute as the markers get further away from the middle marker, compiling the responses to the questionnaire, and generating a report that displays the results of the questionnaire.

Preferably, the human performance skills and/or attributes relate to management and/or leadership performance skills and/or attributes. The method further comprises the steps of associating each marker with a numerical value. Preferably, this step includes associating the middle marker with a numerical value of zero, associating the markers on the first side of the middle marker with negative numerical values, and associating the markers on the first side of the middle marker with positive numerical values.

In a preferred embodiment, pairs of questionnaire elements that relate to opposing but complementary human performance skills are generated. Each questionnaire element in a pair is randomly dispersed throughout the questionnaire such that the questionnaire elements of each pair are not located next to one another.

The compiling step includes determining a versatility index by geometrically calculating how close the target individual is to having the proper amount of the performance skill and/or attribute in each element of a pair of questionnaire elements. The compiling step may also include averaging the responses to each element in the questionnaire, counting the number of responses on the first side of the dual sided continuum, and counting the number of responses on the second side of the dual sided continuum.

In an additional embodiment, the method of the present invention may be implemented over the internet by storing the questionnaire on a server that is accessible via the internet and enabling responses to the questionnaire to be sent electronically over the internet.

BRIEF DESCRIPTION OF THE DRAWINGS

FIG. 4 displays a report generated in accordance with a third embodiment of the present invention.

DETAILED DESCRIPTION OF THE PREFERRED EMBODIMENTS

The illustrations and examples discussed in the following description are provided for the purpose of describing the preferred embodiments of the invention and are not intended to limit the invention thereto.

The present invention overcomes the deficiencies of the prior art methods for collecting and analyzing human performance data by providing a method that directly measures both overdoing and underdoing behaviors and measures those behaviors in terms of dichotomies.

Figure 1A:
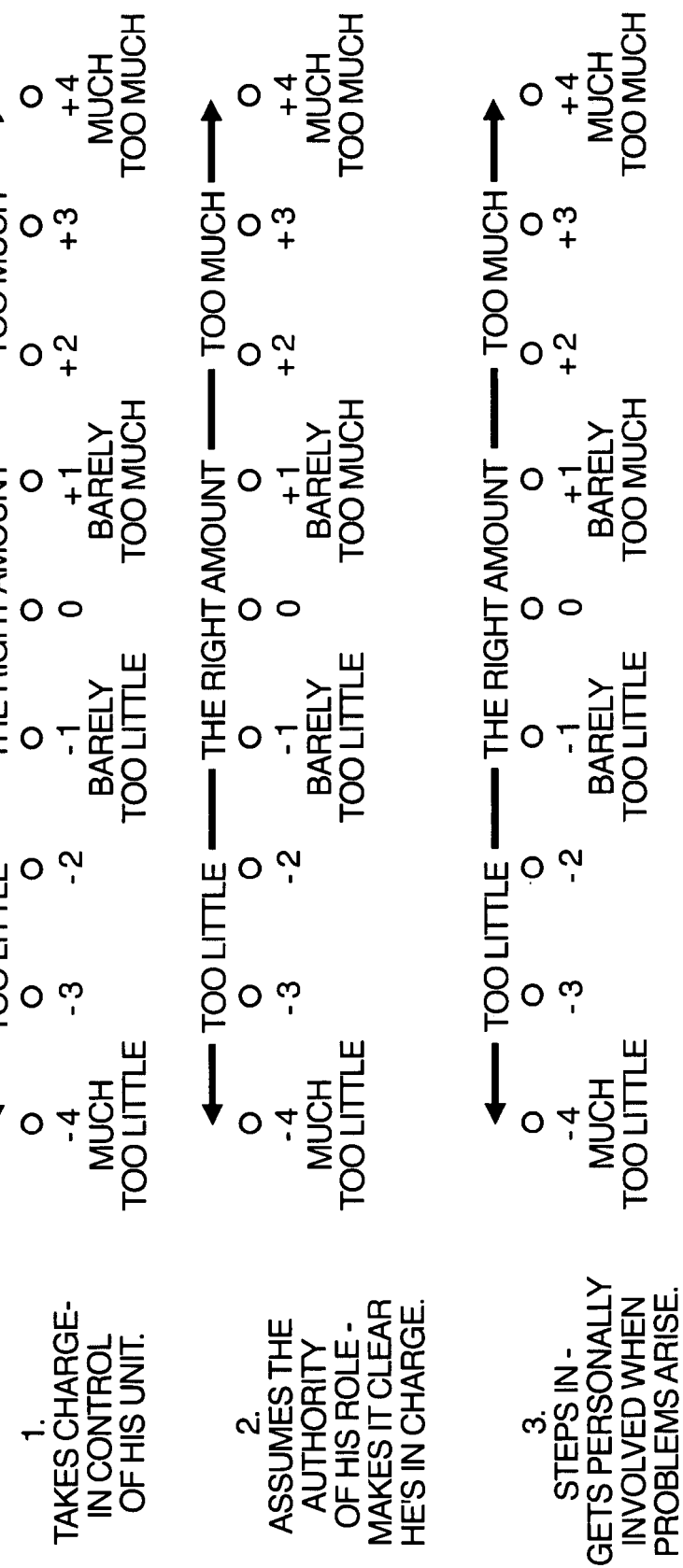
FIGS. 1A–1B display a questionnaire used in accordance with the method of the present invention.
Figure 1B:
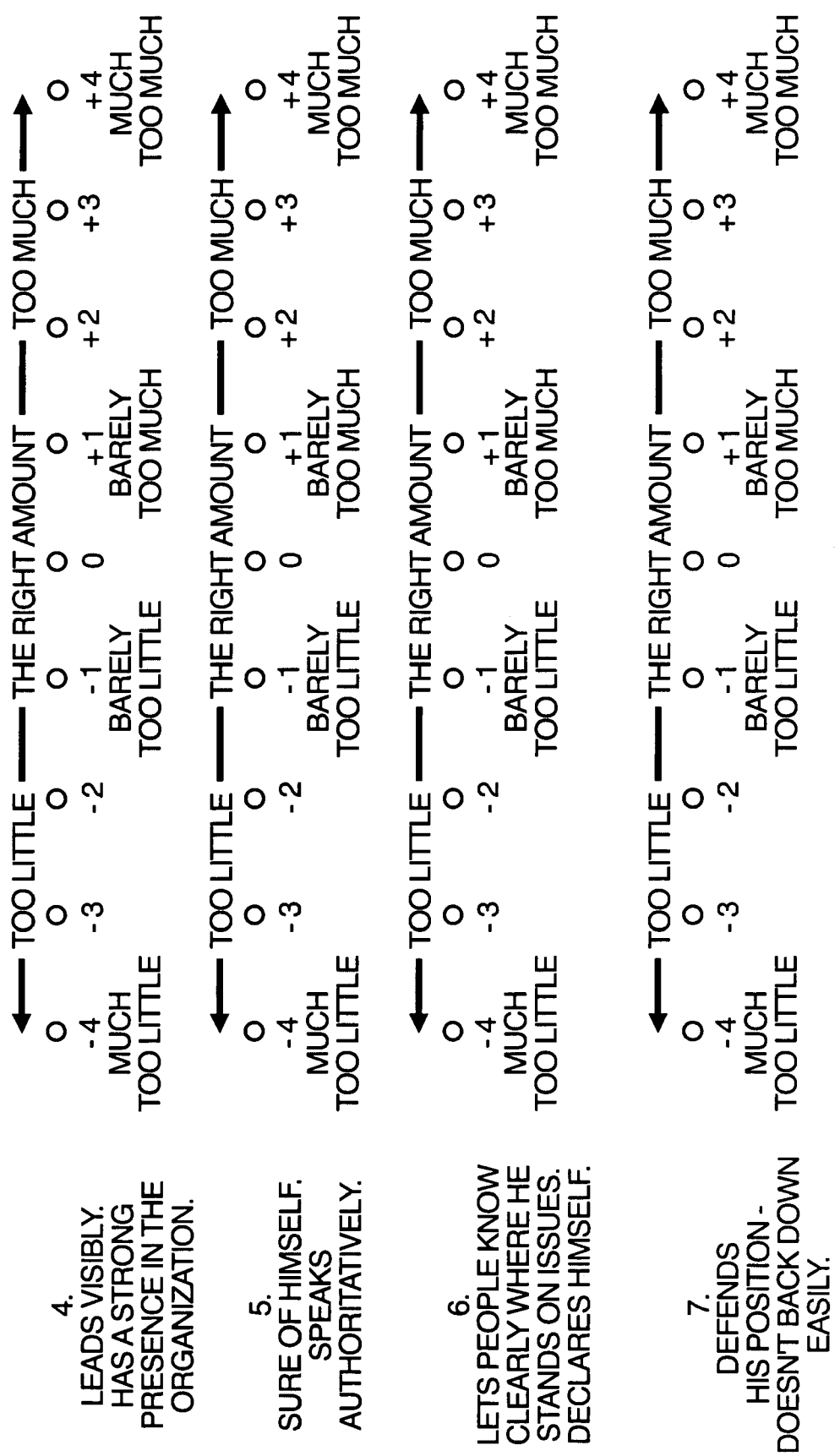

The method of the present invention comprises the steps of creating and displaying questionnaire elements that measure human performance, such as management performance, analyzing the responses, and displaying a report that measures the results. Skilled psychologists are preferably consulted to generate the format, extent, and types of questions that are relevant to evaluating management skills. An example of a questionnaire that measures the leadership of a manager is shown in FIGS. 1A–1B.

A rating scale is also developed to allow the respondent to rate the target individual's performance with respect to the questionnaire's elements. In a preferred embodiment, this rating scale is a dual sided continuum of values having a middle point that is associated with what the respondent believes is the right amount of the behavior. This middle point may be associated with a combination of letters, words and/or numbers designating it as being the right amount. For example, in Table 2 shown below, the middle point is designated by the number "0" and the written description "The right amount."

TABLE 2

Scale used in accordance with the present invention

| ← Too little-The right amount-Too much → | | | | | | | | |
|---|---|---|---|---|---|---|---|---|
| ● | ● | ● | ● | ● | ● | ● | ● | ● |
| −4 | −3 | −2 | −1 | 0 | +1 | +2 | +3 | +4 |
| Much Too little | | | Barely Too little | | Barely Too Much | | | Much Too Much |

Figure 2A:
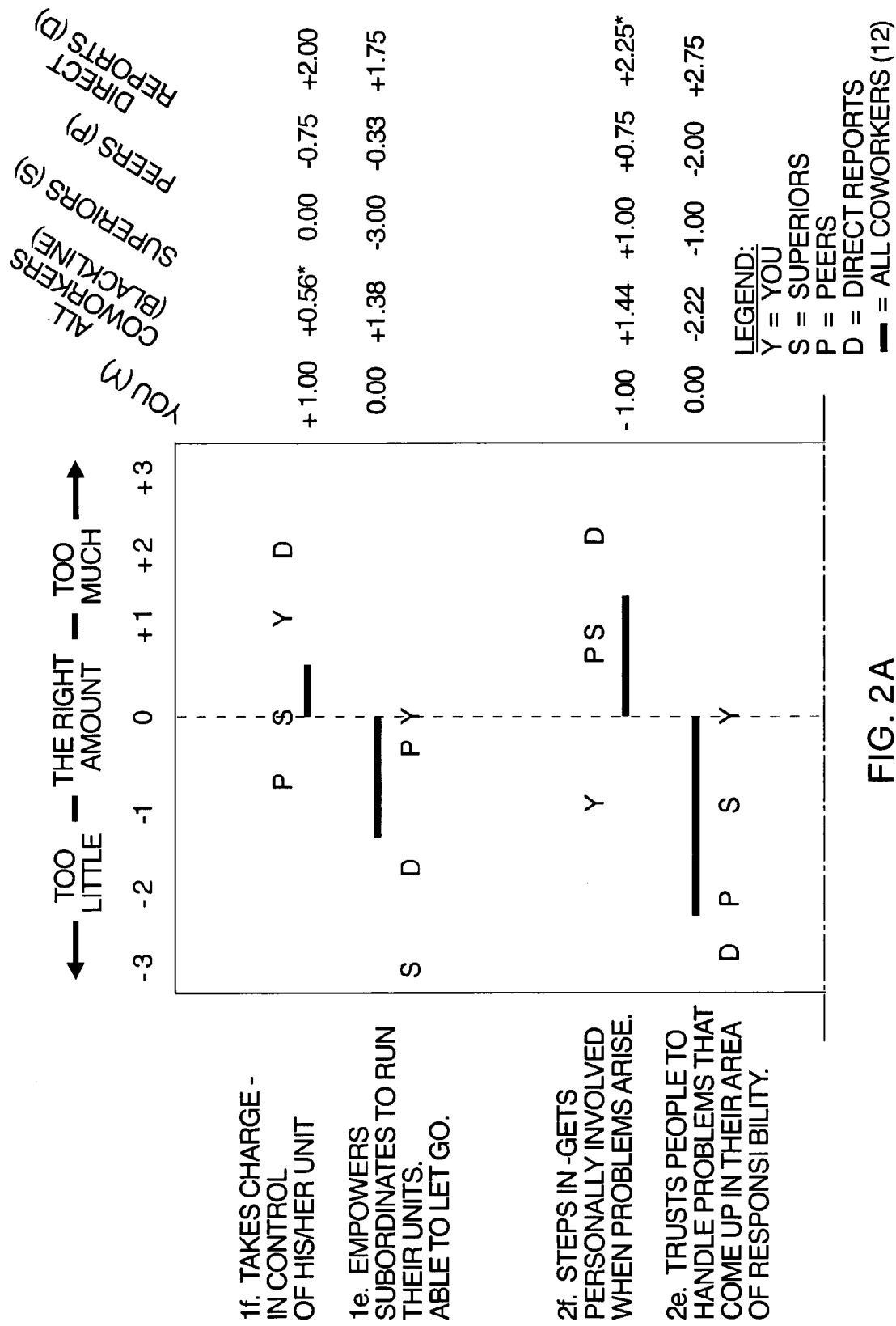
FIGS. 2A–2C display a report generated in accordance with a first embodiment of the present invention.
Figure 2B:
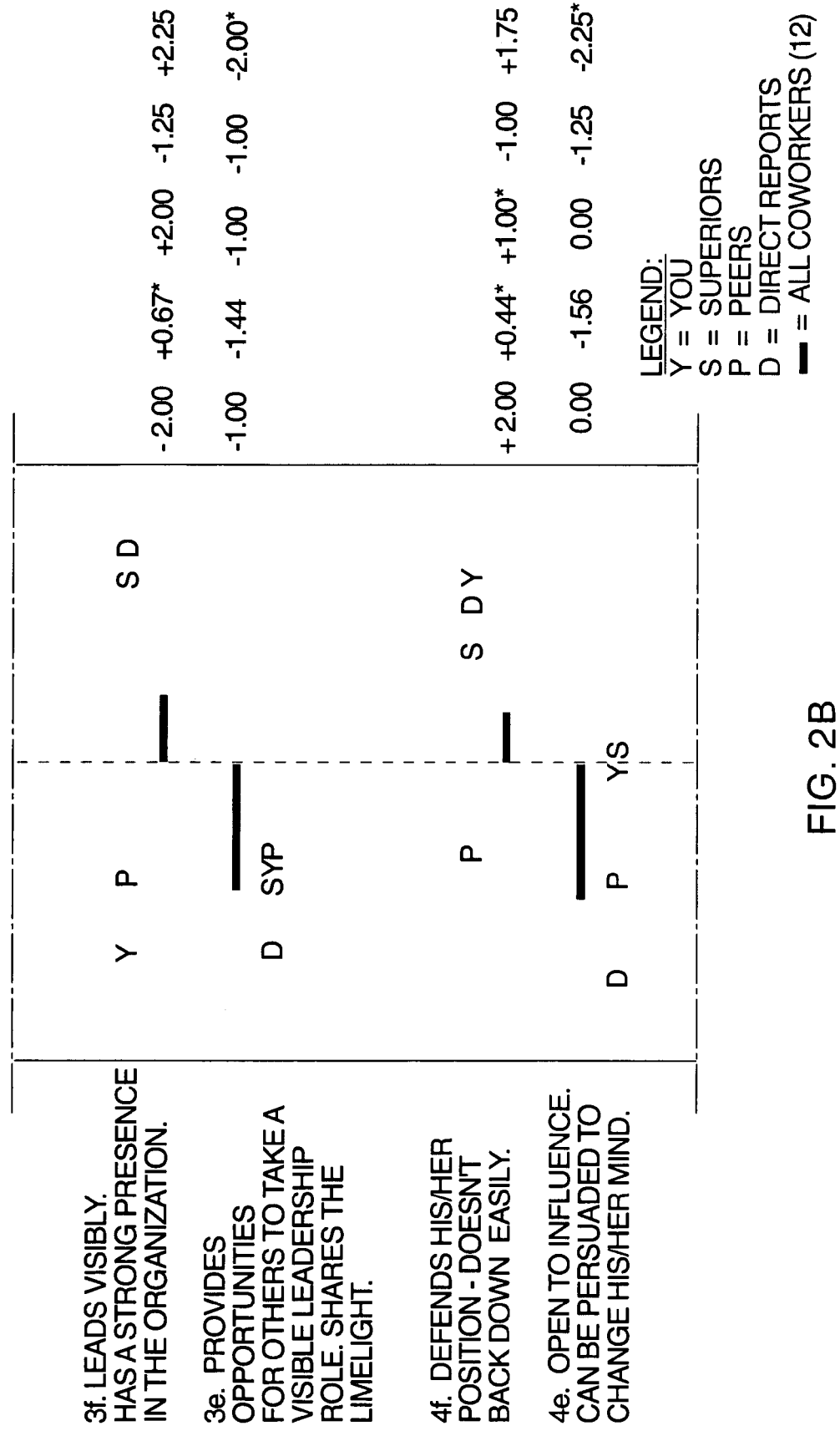
Figure 2C:
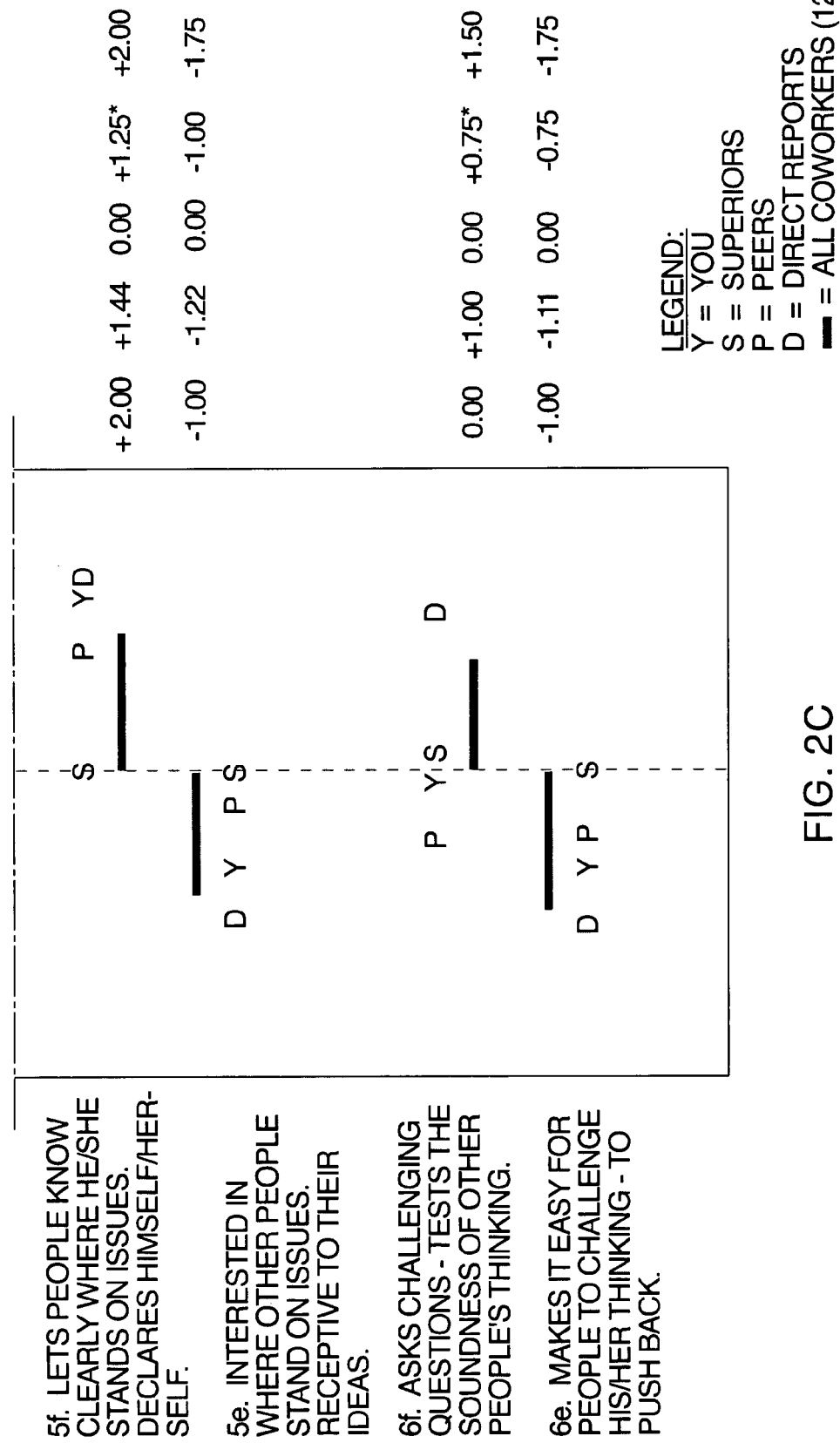

Valuation markers are designated on both sides of the continuum extending from the middle point. On one side of the middle point, the markers designate too little of the rated behavior and the intensity of the behavior increases as the markers get further away from the middle point, as shown in Table 2. The markers on the other side of the middle point are associated with too much of the rated behavior and also increase in intensity as the markers get further away from the middle point, as shown in FIGS. 2A–2C. Again, these markers may be designated with any combination of letters, words, and/or numbers indicating the intensity of the behavior.

This dual-sided scale is based on the premise that there are two kinds of performance problems: 1) when individuals emphasize something too much, and 2) when they put too little emphasis on something. Because the "best" score is located in the middle, between the two forms of performance problems, performance measured with this type of rating method does not suffer from the ambiguity of frequency/magnitude rating scales, where higher scores could indicate either high performance or overdoing it. In addition, performance measured with this type of rating method does not suffer from the ambiguity in evaluation rating scales, where low scores could be the result of either underdoing it or overdoing it. Therefore, the rating method of the present invention clearly indicates those areas where the target individual needs to make up deficiencies or moderate extremes.

The method of the present invention also comprises the step of organizing the questionnaire elements into pairs of opposing behaviors that actually complement one another. For example, the dichotomy of talking versus listening. Effective communicators are adept at doing both; they neither talk too much nor too little and they neither listen too much nor too little. When complementary pairs of human behaviors are presented side-by-side in an assessment report, the human tendency toward lopsidedness can be readily detected, as well as versatility. Also, the state of being underdeveloped (underdo) or overdeveloped (overdo) on both behavioral characteristics in a dichotomy can be readily detected. In a preferred embodiment, the questionnaire that is presented to the respondent does not list the paired elements in sequential order. Rather, the paired elements are randomly dispersed throughout the questionnaire to distract the respondent from focusing too much on one type of skill or attribute.

Once all of the questionnaire responses are collected, the results are compiled, analyzed, and displayed in an assessment report. The assessment reports may take on several different forms, some examples of which are discussed below.

FIGS. 2A–2B provide a first example of how the results using this dual sided rating scale and this two sided model of leadership can be analyzed and reported. In this example, the questionnaire elements from FIGS. 1A–1B are reorganized so that the pairs of skills and attributes, discussed above, are grouped together. The numerical values associated with each response to each questionnaire element are averaged and the resulting number is reflected on the dual sided scale using a bar graph, as shown in the Figure. In this example, six pairs of behavioral characteristics were rated by thirteen individuals; the manager himself, two superiors, five peers, and five subordinates. It is obvious that this fictional manager has a lopsided leadership style: he is regarded by his coworkers as overdoing items 1f., 2f., 3f., 4f., 5f., and 6f., which are items that measure the self-assertive, forceful aspects of leadership. The fictional manager is also regarded as underdoing items 1e., 2e., 3e., 4e., 5e., and 6e., which are items that measure the participative, empowering aspects of leadership. Conventional evaluation methods and scales do not juxtapose complementary characteristics and are, therefore, ill equipped to reveal this pattern in the individual's performance.

Figure 3:
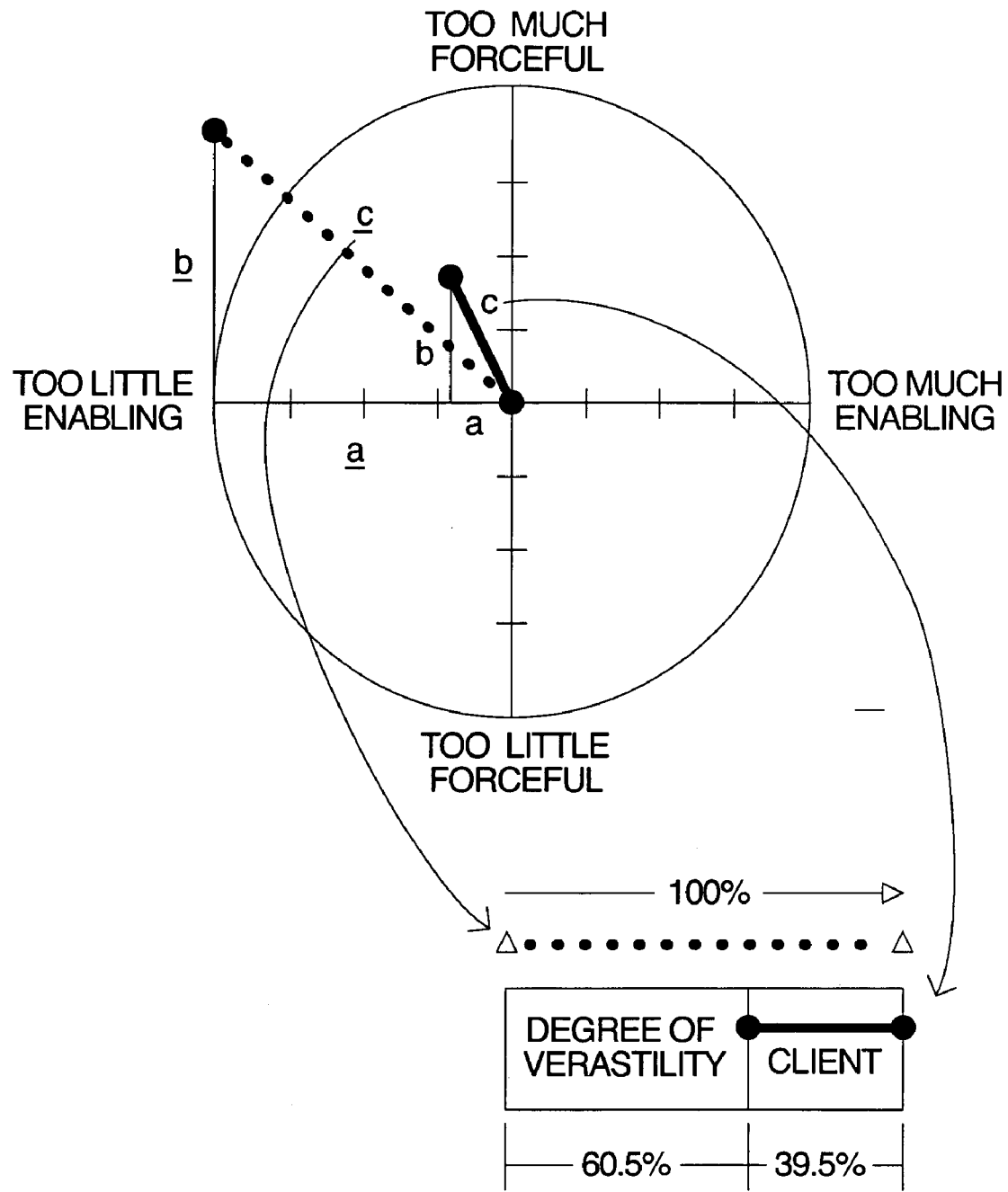
FIG. 3 displays a report generated in accordance with a second embodiment of the present invention.

FIG. 3 displays an assessment report that is generated by analyzing and displaying questionnaire responses in accordance with a second embodiment of the present invention. In this embodiment, the extent of the rated individual's versatility is calculated and displayed on a polar graph. The example shown relates to a duality of questionnaire elements relating to forcefulness and enablement. The polar graph is broken into four quadrants describing amounts of these behaviors: too forceful, too enabling, too little forceful, and too little enabling. The center of the polar graph, where the four axes meet, is the right amount of both behaviors. The geometric distance the rated individual is from being perfectly versatile is derived by using the Pythagorean theorem: $c^2=a^2+b^2$ where a=(forceful score–0), b=(enabling score–0), and c=the distance from optimal versatility. In this example, the rated individual was given a (+2) for being too forceful and a (–1) for being too little enabling. Therefore, the individual's distance from being optimal is 2.236 ($c^2=(+2)^2+(1)^2$). The maximum possible distance from being perfectly versatile in this example is a score of (+4) and (–4). This computes to a distance of 5.67 ($c^2=(+4)^2+(4)^2$). The versatility index is then computed by subtracting the individual's distance from the maximum distance, and dividing that number by the maximum distance.

$$\text{Versatility Index} = \frac{\text{Max. Distance} - \text{Client's Distance}}{\text{Max. Distance}} \times 100\%$$

In the example shown in FIG. 4, the resulting versatility index is 60.5%, which indicates how close the individual's scores are to being the "right amount" on both sides of the duality.

FIG. 4 displays an assessment report generated by analyzing the data in accordance with a third embodiment of the present invention. In this example, the number of respondents who indicated that the individual does too much or too little in response to an element on the questionnaire is counted. These numbers are displayed on the report. Preferably, these numbers are displayed as a total and then broken down into categories such as peers, superiors, and direct reports.

Certain modifications and improvements will occur to those skilled in the art upon a reading of the foregoing description. For example, the method of the present invention is not limited to measuring management skills and attributes. Rather, the method may be used to measure any type of human behavior. Further, the present invention is not limited to the types of questions referred to in the Tables and Figures. A plurality of proprietary questionnaire elements may developed within the spirit and scope of the invention. Also, the present invention is not limited to distribution and collection of the questionnaire and report on paper. Rather, the method may be electronically implemented by making the questionnaire available on the internet and enabling the responses to be electronically sent back to a central server. The responses can then be computed by proprietary software and electronically sent to the client in the form of a report. All such modifications and improvements of the present invention have been deleted herein for the sake of conciseness and readability but are properly within the scope of the following claims.

What is claimed is:

1. A method for collecting data relating to human performance skills and/or attributes comprising the steps of:
    creating a questionnaire comprising elements relating to the human performance skills and/or attributes of a target individual wherein said creating step comprises the step of generating pairs of questionnaire elements that relate to opposing but complementary human performance skills;
    establishing a rating scale for responses to the elements in the questionnaire wherein the rating scale comprises a dual sided continuum having a first side and a second side and a plurality of markers;
    designating a marker in the middle of the continuum as the middle marker which is associated with a proper or optimal amount of the performance skill and/or attribute;
    designating the markers on the first side of the middle marker on the continuum as exhibiting too much of the human performance skill and/or attribute, said markers being associated with increasing magnitude of too much of the human performance skill and/or attribute as the markers get further away from the middle marker;
    designating the markers on the second side of the middle marker on the continuum as exhibiting too little of the human performance skill and/or attribute, said markers being associated with increasing magnitude of too little of the human performance skill and/or attribute as the markers get further away from the middle marker;
    presenting the questionnaire to at least two people;
    compiling the responses to the questionnaire from the at least two people; and
    generating a report that displays the results of the questionnaire.

2. The method of claim 1 further comprising the step of randomly dispersing each questionnaire element of each pair of questionnaire elements throughout the questionnaire such that the questionnaire elements of each pair are not located next to one another.

3. The method of claim 1 wherein said compiling step comprises the step of determining a versatility index by geometrically calculating how close the target individual is to having the proper amount of the performance skill and/or attribute in each element of a pair of questionnaire elements.

4. The method of claim 1 wherein the questionnaire elements of each pair of questionnaire elements are not located next to one another in the questionnaire.

* * * * *

UNITED STATES PATENT AND TRADEMARK OFFICE
CERTIFICATE OF CORRECTION

| | | |
|---|---|---|
| PATENT NO. | : 7,121,830 B1 | Page 1 of 1 |
| APPLICATION NO. | : 10/323711 | |
| DATED | : October 17, 2006 | |
| INVENTOR(S) | : Robert E. Kaplan et al. | |

It is certified that error appears in the above-identified patent and that said Letters Patent is hereby corrected as shown below:

Title Page
(57) Abstract, line 11, "increased intensity" should read -- exhibiting too much --.

Column 5
Line 4, "FIGS. 2A-2B" should read -- FIG. 2A-2C --;

Line 49, "$(4)^2$)" should read -- $(-4)^2$). --.

Signed and Sealed this

Fifth Day of June, 2007

JON W. DUDAS
*Director of the United States Patent and Trademark Office*